(12) United States Patent
Van Der Meijden et al.

(10) Patent No.: US 8,197,764 B2
(45) Date of Patent: Jun. 12, 2012

(54) DEVICE FOR PRODUCING A PRODUCT GAS FROM A FUEL, SUCH AS BIOMASS

(75) Inventors: Christiaan Martinus Van Der Meijden, Den Helder (NL); Abraham Van Der Drift, Castricum (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 141 days.

(21) Appl. No.: 12/530,121

(22) PCT Filed: Mar. 4, 2008

(86) PCT No.: PCT/NL2008/050125
§ 371 (c)(1),
(2), (4) Date: Feb. 26, 2010

(87) PCT Pub. No.: WO2008/108644
PCT Pub. Date: Sep. 12, 2008

(65) Prior Publication Data
US 2010/0143208 A1 Jun. 10, 2010

(30) Foreign Application Priority Data
Mar. 5, 2007 (NL) .................................... 2000520

(51) Int. Cl.
*B01J 8/18* (2006.01)
*C10J 3/54* (2006.01)
(52) U.S. Cl. ...................................................... 422/139
(58) Field of Classification Search .................. 422/139
See application file for complete search history.

(56) References Cited

U.S. PATENT DOCUMENTS

| 2,854,319 A | * | 9/1958 | Patton ........................... 422/609 |
| 2,861,943 A | * | 11/1958 | Finneran, Jr. et al. ........... 208/59 |
| 3,959,117 A | * | 5/1976 | Bunn et al. ..................... 208/113 |

(Continued)

FOREIGN PATENT DOCUMENTS
CH 614132 A5 11/1979
(Continued)

OTHER PUBLICATIONS

A. Van Der Drift, et al., "MILENA Gasification Technology for High Efficient SNG Production From Biomass", 14th European Biomass Conference & Exhibition, Paris, France, Oct. 17-21, 2005, 5 pages.

*Primary Examiner* — Walter D Griffin
*Assistant Examiner* — Huy-Tram Nguyen
(74) *Attorney, Agent, or Firm* — Fliesler Meyer LLP

(57) ABSTRACT

A device for producing a product gas from a fuel, such as biomass, comprises a reactor which is delimited by a base and reactor walls. The reactor walls comprise a peripheral wall and an upper wall. The reactor comprises a supply opening for the supplying of biomass, as well as at least one riser for chemically converting the biomass supplied to a product gas and a solid. The riser is provided inside the peripheral wall and comprises an upper end and a tower end. The reactor furthermore has a discharge opening for discharging the product gas. The riser is attached to at least one reactor wall. The lower end of the riser is at a distance above at least one section of the base which is underneath it and is freely movable under the effect of thermal expansion.

15 Claims, 4 Drawing Sheets

U.S. PATENT DOCUMENTS

| | | | |
|---|---|---|---|
| 4,799,937 A | | 1/1989 | Nieminen |
| 5,895,508 A | * | 4/1999 | Halow ............................. 48/77 |
| 2008/0081006 A1 | * | 4/2008 | Myers et al. ................. 422/145 |

FOREIGN PATENT DOCUMENTS

| | | |
|---|---|---|
| DE | 2425963 | 12/1975 |
| EP | 0239589 | 10/1987 |
| EP | 0435424 A1 | 7/1991 |
| FR | 2530793 A1 | 1/1984 |
| WO | WO8701719 | 3/1987 |
| WO | WO 02/33030 | 4/2002 |
| WO | WO 02/40618 | 5/2002 |
| WO | WO0240618 A1 | 5/2002 |
| WO | WO 2005/037422 | 4/2005 |
| WO | WO2005037422 A1 | 4/2005 |
| WO | WO 2007/061301 | 5/2007 |

* cited by examiner

DEVICE FOR PRODUCING A PRODUCT GAS FROM A FUEL, SUCH AS BIOMASS

The invention relates to a device for producing a product gas from a fuel, such as biomass, comprising a reactor which is delimited by a base part or bottom part and reactor walls, which reactor walls comprise a peripheral wall and an upper wall or top wall, which reactor comprises:
- a supply opening for the supplying of fuel,
- at least one riser for chemically converting the fuel supplied to at least a product gas, which riser is provided inside the peripheral wall and comprises an upper end or top end and a lower end or bottom end, as well as
- a discharge opening for the discharging of the product gas.

A device for producing a product gas from biomass is known. The biomass supplied to the riser usually comprises 80% by weight of volatile constituents and 20% by weight of substantially solid carbon or char. Heating said biomass supplied to the riser to a suitable temperature in a low-oxygen, i.e. a substoichiometric amount of oxygen, or oxygen-free environment results in pyrolysis and gasification in the riser. Said suitable temperature in the riser is usually greater than 800° C., such as between 850-900° C.

The pyrolysis of the volatile constituents results in the creation of a product gas. The product gas is, for example, a gas mixture which comprises CO, $H_2$, $CH_4$ and optionally higher hydrocarbons. After further treatment, said combustible product gas is suitable for use as a fuel. Due to the low gasification speed, the char present in the biomass will gasify in the riser merely to a limited extent. The char is therefore usually combusted in a separate zone of the reactor. In addition, as a result of pyrolysis and gasification, various undesirable substances may be released, such as tar.

During start-up of the installation, the temperature rises from room temperature to the pyrolysis and gasification temperature within a relatively short time. The riser is therefore subjected to a considerable degree of thermal expansion. This may result in damage to the riser, such as the formation of cracks.

It is an object of the invention to provide a device for producing a product gas from biomass, in which the risk of damage as a result of thermal expansion of the riser is reduced.

This object is achieved according to the invention in that the riser is attached to at least one reactor wall, and the lower end or bottom end of the riser is at a distance above at least one section or portion of the base which is underneath it and is freely movable under the effect of thermal expansion. According to the invention, the riser is suspended from the peripheral wall and/or the top wall of the reactor. For example, the top end of the riser is attached to the peripheral wall and/or the top wall of the reactor. The bottom end of the riser is free to expand into the bottom region of the reactor under the effect of thermal expansion in the longitudinal direction of the riser. The extension as a result of thermal expansion is for example approximately 5 cm. At its bottom end, the riser is not attached so that no local thermal stresses occur. The thermal expansion of the riser is thus accommodated for at the underside of the reactor. The risk of damage is thus reduced.

It should be noted that a fluidized-bed reactor is disclosed in WO2005/037422 in which a fluidizing gas flows into a distribution chamber at the bottom of the reactor via an inlet. From the distribution chamber, the fluidizing gas passes to the bottom end of a riser, where the gas mixes with fluidized particles. Above the distribution chamber, solid matter is supplied to the riser. After leaving the riser at its top end, gas and solid particles are separated from one another in a cyclone chamber. Although mention is made of the fact that the riser can thermally expand freely in the vertical direction, it is not stated where said thermal expansion is accommodated for. According to the invention, the bottom end of the riser can expand freely, while the top end is fixed.

In one embodiment, the upper end or top end of the riser is attached by a partition wall to the peripheral wall of the reactor, in which the interior of the reactor comprises a separation chamber and a combustion chamber, which are separated from one another in a substantially gas-tight manner by the partition wall. The connection between the top end of the riser and the peripheral wall is substantially gas-tight. The separation chamber and the combustion chamber are only in communication with one another by means of the riser and for example one or more downcomers. For the rest, the separation chamber and the combustion chamber are separated in a gas-tight manner from one another. As a result, undesirable leakage between the separation chamber and the combustion chamber is prevented.

In one embodiment, the reactor comprises a fluidizable bed of granular material which is arranged on the base or bottom of the reactor, in which the bottom end of the riser extends into the fluidizable bed. In use, the bottom end of the riser extends into the fluidized bed.

In order to produce a fluidized bed, it is possible to provide for example at least one nozzle for injecting a fluidizing fluid in or under the riser. In use, the riser is partly filled with a granular material, such as grains of sand, which fluidizes on account of the fluidizing gas above the nozzle. Due to the fact that the bottom end of the riser extends into the bed of granular material, there can be no exchange of gas between the gas inside and the gas outside the riser above the bed of granular material. Due to combustion, such an exchange of gas could result in local hot spots and thus in damage to the material of the riser.

It should be noted that the fluidized bed of granular material above the nozzle conducts heat. As a result, the temperature of the fluidized bed of granular material is therefore substantially uniform. Said temperature of the bed of granular material is relatively high, for example higher than 800° C., such as between 850-950° C. However, below the nozzle in the riser, the granular material forms a "dead zone", in which the granular material is substantially stationary. In contrast to a fluidized bed of granular material, stationary granular material is a heat-insulator. This results in a considerable temperature gradient in the vertical direction of the riser—in the downward direction, the temperature of the granular material in the riser gradually decreases to ambient temperature.

The nozzle is, for example, arranged above the portion of the bottom which is underneath the riser. The "dead" zone is then situated between said portion and the nozzle, with the bottom end of the riser being located above it. If the bottom end of the riser is situated in the "dead" zone of the bed of granular material, the bottom end is situated in a relatively cold zone of the reactor. It should be noted that the temperature in the relatively cold zone can still be 300° C. or higher. This temperature is lower than the temperature of the riser at the fluidized bed of granular material.

Preferably, the bottom end of the riser is situated underneath the supply opening for the supplying of fuel. In use, the fuel is supplied, for example, from the side to the fluidized bed, which is at a relatively high temperature so that pyrolysis and gasification of the fuel can take place in an effective manner.

According to the invention, it is possible for the fluidizing fluid in the riser to be a fluidizing gas, which is for example formed by steam or carbon dioxide ($CO_2$). Steam and carbon dioxide ($CO_2$) are advantageous because owing to the merely limited presence or even absence of nitrogen. Other low-nitrogen gases are also suitable. Depending on the use, the type of biomass supplied and the specifications of the product gas to be produced, it is, however, possible to use other fluidizing gases.

In one embodiment of the invention, the riser is open at its top end, wherein the reactor comprises a separation chamber between the open top end of the riser and the top wall for separating gas and solid particles, which is designed, for example, as a rest chamber. The rest chamber forms a reservoir having a relatively large volume. In use, the product gas produced in the riser and the entrained solid matter, including char and particles of the fluidized bed, discharge into the rest chamber. As a result, the speed will decrease, since the flow-through surface area of the rest chamber is much greater than the flow-through surface area of the riser. The solid matter from the riser will therefore sink down again on account of the force of gravity.

In this case, the discharge opening for discharging the product gas can be arranged in the top wall, which discharge opening is substantially aligned with respect to the open top end of the riser. If the rest chamber is sufficiently high, the force of gravity adequately prevents relatively large solid particles from reaching the discharge opening for the product gas. Incidentally, it is still possible for fine dust particles to be discharged together with the product gas via the discharge opening. In practice, the product gas will therefore be subjected to an after-treatment. Said after-treatment comprises, for example, cooling, dust removal and tar removal.

In a preferred embodiment, the reactor is provided with a combustion chamber which is connected to the separation chamber by at least one downcomer. Each downcomer provides a connection between the separation chamber and the combustion chamber. For the rest, the combustion chamber is hermetically separated from the rest chamber by the partition wall. The bottom end of each downcomer extends into the fluidized bed. In use, the solid matter produced by the pyrolysis and gasification, unreacted biomass and particles of the fluidized bed which have passed into the separation chamber via the riser and have been separated off there, are returned to the combustion chamber via the downcomer. The char subsequently combusts in the combustion chamber resulting in flue gases and ashes.

In one embodiment, the riser is provided with a passage opening for allowing granular material to pass from the combustion chamber to the riser, the passage opening being arranged underneath the supply opening for the supply of biomass. In use, inert granular particles of the fluidized bed circulate in the reactor, such as grains of sand. The gases produced in the riser carry said particles along from the fluidized bed of the riser into the separation chamber. From the separation chamber the particles sink back to the fluidized bed in the combustion chamber via the downcomer or downcomers. The particles can then be recirculated to the riser via the passage opening. The passage opening is, for example, arranged laterally in the peripheral wall of the riser.

According to the invention, the reactor preferably comprises several downcomers which are evenly distributed over the reactor. The reactor may have, for example 2, 3, 4, 5 or more downcomers. By using several downcomers, the char is more evenly distributed in the combustion chamber.

According to the invention, the configuration of the risers and downcomers of the reactor may be designed in various ways. According to the invention, it is, for example, possible to arrange the riser substantially centrally inside the peripheral wall of the reactor, and in which the downcomers are positioned at a radial distance from the riser. The riser and the downcomers are in this case, viewed in cross section, distributed evenly inside the peripheral wall of the reactor.

In a preferred embodiment of the invention, the one or more risers, the one or more downcomers and the partition wall in between are formed integrally as a frame, which is suspended from at least one of the reactor walls of the reactor. The frame preferably comprises metal, such as steel. The top of the steel frame is attached to the peripheral wall and/or the top wall of the reactor. At the bottom of the steel frame, the riser and the downcomers can expand freely. The bottom end of the downcomers is in this case situated above the bottom of the reactor.

According to the invention, it is possible for the combustion chamber to comprise several nozzles for supplying fluidizing air. The nozzles are at a distance from the bottom of the reactor. In use, the combustion chamber is partially filled with a granular material, such as grains of sand. Both the combustion chamber and the riser contain a bed of granular material. By providing the fluidizing air from below, said bed of granular material fluidizes above the nozzles. The temperature in the fluidized bed of granular material is substantially evenly distributed. Said temperature is usually greater than 900° C., for example 950° C. The char which is supplied to the combustion chamber via the downcomer combusts in said hot fluidized bed, for example made up of hot grains of sand. The fluidizing air in this case also serves as combustion air.

According to the invention, the peripheral wall of the reactor, at a distance above the nozzles of the combustion chamber, preferably comprises at least one inlet opening for introducing secondary air. The supply of secondary air results in a good afterburn, which favorably affects the properties of the flue gases and ashes produced during the combustion.

In one embodiment of the invention, the peripheral wall has at least one outlet opening for discharging the flue gases produced by combustion. The outlet opening for flue gases is in this case preferably positioned on the side. The flue gases discharged via the outlet opening are usually subjected to an after-treatment, for example cooling and/or dust removal.

In one embodiment, the reactor is provided with a positioning member for positioning the bottom end of the riser. The positioning member is, for example, at least partially situated in the fluidized bed of granular material. Brick lining may be provided between the peripheral wall of the reactor and the combustion chamber and separation chamber, i.e. a body made of insulating material. For example, the combustion chamber is formed by a substantially cylindrical recess in said brick lining, while the separation chamber is delimited by a metal peripheral wall which bears against said recess. The positioning member in this case comprises, for example, a number of supporting parts of the brick lining which laterally engage with the bottom end of the riser. Said supporting parts extend radially inwards into the cylindrical recess in order to lock the bottom end of the riser—the bottom end is still able to move in the longitudinal direction under the effect of thermal expansion.

In one embodiment, the positioning member is provided with a positioning tube which is aligned with respect to the riser, in which the positioning tube and the riser are partially fitted inside one another. The diameter of the positioning tube is smaller or greater than the diameter of the riser, so that the bottom end of the riser and the top end of the positioning tube fit into one another. The riser can expand freely with respect to the positioning tube.

It is possible for an annular gap to be formed between the positioning tube and the riser, and in which the radial distance of said gap is greater than 1 mm, for example 2 or 3 mm. The annular gap has a double function. On the one hand, the gap ensures that the riser, at its bottom end, is able to move freely under the effect of thermal expansion with respect to the positioning tube. On the other hand, the gap provides an additional passage opening for allowing granular material to pass from the combustion chamber to the riser.

In one embodiment, the bottom has a passage opening in which the positioning tube is fixed. In this case, the positioning tube projects beyond the bottom of the reactor. If desired, the passage area of the passage opening can be adjusted by displacing the positioning tube. As a result, the top end of the positioning tube can partially seal the passage opening. To this end, the attachment means of the positioning tube has an attachment position, in which the positioning tube is attached in a sealing manner with respect to the bottom, and a release position, in which the positioning tube can be displaced in a sealing manner through the passage opening in the bottom wall.

The sealing is designed in such a manner that the positioning tube can move past it without leakage. The sealing may be designed in various ways. The sealing comprises a gland packing, for example. A gland packing has a deformable sealing element. By tightening at least one bolt, the sealing element which is deformed as a result presses, under prestress, against both the outer wall of the positioning tube and the bottom of the reactor. The passage opening between the positioning tube and the bottom is then sealed, while the positioning tube can be displaced along the packing.

In one embodiment of the invention, the bottom of the reactor comprises a first bottom section or portion which is connected to the underside of the peripheral wall of the reactor, as well as a peripheral wall section or portion which projects downwards from the first bottom portion and the periphery of which is smaller than the periphery of the peripheral wall of the reactor, the riser extending inside the peripheral wall portion, and the bottom having a second bottom section or portion which is connected to the underside of the peripheral wall portion, and the riser being arranged at a distance above the second bottom portion. The second bottom portion of the bottom is therefore situated radially inside and under the first bottom portion thereof. The first bottom portion of the bottom forms the bottom wall of the combustion chamber. As a result of the projecting peripheral wall portion, the bottom end of the riser is situated underneath the combustion chamber.

In this case, it is preferable if the supply opening for supplying fuel is arranged between the bottom wall of the combustion chamber and the second bottom portion of the peripheral wall portion. In other words, the supply opening is situated below the bottom wall of the combustion chamber. As a result, it is possible for the feed duct connected to the supply opening to run underneath the combustion chamber rather than through the combustion chamber. The supplying of biomass to the riser is therefore simple.

According to an embodiment of the invention, the bottom comprises at least one funnel which is provided at the tapered bottom end with a draining means for the draining of granular material, such as grains of sand. In practice, the biomass supplied to the reactor contains impurities, for example small pebbles, nails, or pieces of glass. Said impurities end up in the bed of granular material in the riser or the combustion chamber. The impurities sink down in the bed of granular material in the respective funnels. Next, bed material is drawn off via the draining means from which the impurities are removed. Then, the purified bed material or new bed material is returned to the reactor. In this manner, an optimum bed of granular material in the riser and the combustion chamber is ensured.

The invention will now be described in more detail with reference to the drawing, in which.

Figure 1:
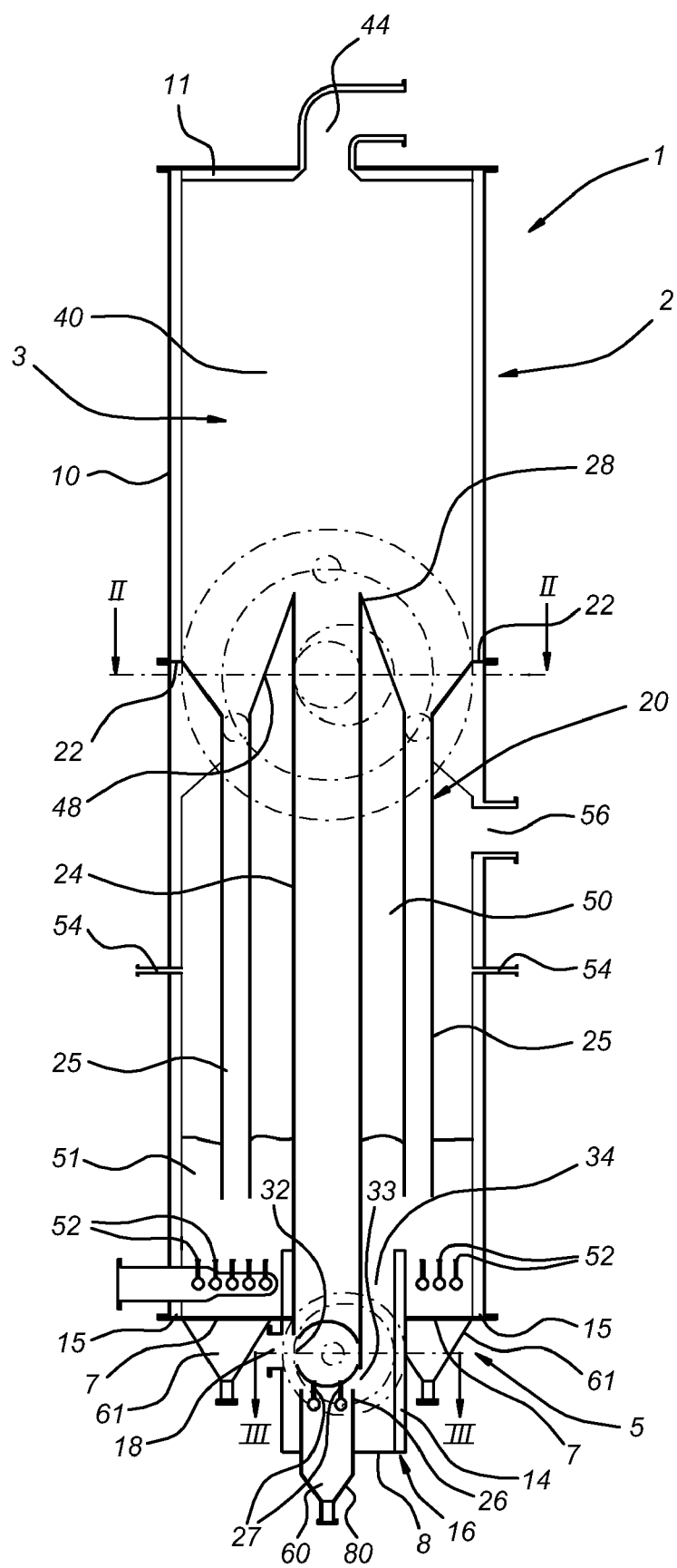
FIG. 1 shows a cross-sectional view of the device for producing a product gas from biomass according to a first embodiment of the invention.

The device for producing a product gas from biomass according to the invention is denoted overall by reference numeral 1. Biomass generally comprises 80% by weight of volatile constituents. When heating the biomass to a pyrolysis temperature, for example 850° C., these volatile constituents are released relatively quickly. Chemical reactions then result in the formation of CO, $H_2$ and hydrocarbons. The remaining 20% of the biomass essentially comprises solid carbon or char. It takes a considerable time to gasify char at 850° C., but combustion thereof takes place very quickly. The device 1 forms an indirect or allothermic gasifier which combines gasification for the volatile constituents and combustion for the char. As a result of indirect gasification, biomass is converted into a product gas which is suitable as a fuel in, for example, boilers, gas engines and gas turbines.

The device 1 comprises a reactor 2, which is delimited by a base or base part, i.e. bottom or bottom part 5, a peripheral or circumferential wall 10 and a top or upper wall 11. In this description, the peripheral wall 10 and the top wall 11 are referred to as reactor walls. Said reactor walls 10, 11 are heat-resistant walls which are, for example, provided with a heat-insulating inner cladding or are made of heat-resistant material, such as heat-resistant steel. The reactor walls 10, 11 and the bottom part 5 of the reactor 2 surround an interior 3, in which biomass can be treated.

Inside the reactor 2, a frame 20 is suspended from the peripheral wall 10. To this end, the frame 20 is provided with laterally projecting flanges 22, which are attached to the peripheral wall 10 by means of bolts or other attachment means. The frame 20 is made of metal, for example steel. Obviously, the frame 20 can also be suspended from the top wall 11 (not shown).

The frame 20 has a partition wall 48 which divides the interior 3 of the reactor into two spaces 40, 50 which are essentially separate from one another. Said mutually separated spaces form a separation chamber, which is designed as a rest or settling chamber 40 and a combustion chamber 50, respectively. The frame 20 furthermore comprises a riser 24 and three downcomers 25. The riser 24 and the downcomers 25 are arranged in the partition wall 48. The combustion chamber 50 and the settling chamber 40 are only in communication with one another via the riser 24 and the downcomers 25. In other words, the partition wall 48 extends between the riser 24 and the downcomers 25.

Figure 3:
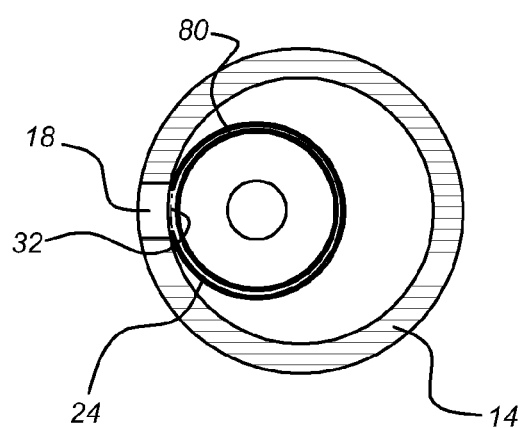
FIG. 3 shows a cross-sectional view along III-III in FIG. 1.

According to the invention, the number of downcomers and risers may vary—for example, the frame has five downcomers (not shown). The riser 24 comprises a bottom end 26 and a top end 28. As is illustrated in FIG. 3, the downcomers 25 are evenly distributed uniformly over the periphery of the reactor 2.

In use, a fluidized bed of granular inert material, for example a bed of sand 51, is present in the combustion chamber 50. To this end, several nozzles 52 are provided in the combustion chamber 50 for supplying fluidizing air. The fluidizing air in this case also serves as combustion air. The peripheral wall 10 of the reactor 2 has several lateral inlet openings 54 for supplying secondary air to the combustion chamber 50. Said inlet openings 54 are arranged at a distance above the bed of sand 51.

The combustion of char in the combustion chamber 50 results in flue gases and ashes. A considerable amount of heat is released as a result. The temperature of the fluidized sand bed in the combustion chamber 50 is, for example, approximately 950° C. The riser 24 is surrounded by the hot combustion chamber 50, as a result of which the riser 24 is also heated. The flue gases leave the combustion chamber 50 via one or more lateral outlet openings 56 extending in the peripheral wall 10 of the reactor 2.

In use, a fluidized bed of granular inert material, such as a bed of sand, is also present in the riser 24. To this end, the riser 24 has several nozzles 27 for the supplying of fluidizing gas. The fluidizing gas is preferably steam, $CO_2$ or another low-nitrogen gas. Biomass to be treated is passed into the fluidized bed of the riser 24. For this purpose, the reactor 2 has a supply opening 18 for supplying biomass and the riser 24 has a feed opening 32 which is connected to the supply opening 18 of the reactor 2.

In use, pyrolysis and gasification of the biomass occur in the riser 24. The temperature in the riser 24 is then 850-900° C. The gases produced during gasification provide an additional upward velocity to the gas stream in the riser 24. Said gases entrain solid matter, including the char and grains of sand from the bed of sand in the riser 24. The fluidizing gas supplied from the nozzles 27 makes merely a limited contribution to the rising of the product gas and the solid matter. The top end 28 of the riser 24, which top end 28 is turned away from the bottom end 26, is open. The open top end 28 of the riser 24 ends in the settling chamber 40. The settling chamber 40 extends between the riser 24 and the top wall 11 of the reactor 2. The top wall 11 comprises a discharge opening 44 for discharging product gas which has been produced in the riser 24.

From the settling chamber 40, the solid matter, including char and grains of sand, entrained in the riser 24 will fall back downward via the downcomers 25. The char and the sand will then end up in the combustion chamber 50. The char combusts in the combustion chamber 50, in the manner described above. The sand from the bed of sand in the combustion chamber 50 may flow to the bed of sand in the riser 24.

In this exemplary embodiment, the bottom 5 of the reactor 2 has a first bottom section or portion 7 which is connected to the bottom edges 15 of the peripheral wall 10. Inside the bottom portion 7, a peripheral wall section or portion 14 is attached which projects downwards. The diameter of the peripheral wall portion 14 is smaller than the diameter of the peripheral wall 10. Like the reactor walls 10, 11, the peripheral wall portion 14 is formed by a heat-resistant wall. On the underside 16 of the peripheral wall portion 14, a second bottom section or portion 8 is attached.

The riser 24 is accommodated inside the peripheral wall portion 14. The diameter of the riser 24 is smaller than the diameter of the peripheral wall portion 14. The bottom end 26 of the riser 24 is not attached to the bottom portion 8, but is situated at a level above the bottom portion 8. The bottom end 26 of the riser 24 forms a free end. As a result the riser 24 can freely expand at its bottom end 26.

In this exemplary embodiment, a positioning tube 80 is provided underneath the riser 24. The diameter of the positioning tube 80 is slightly smaller than the diameter of the riser 24. An annular clearance is provided between the riser 24 and the positioning tube 80 which makes it possible for the riser 24 to expand freely. The bottom end 26 of the riser 24 moves over the positioning tube 80 when the riser 24 expands.

In this exemplary embodiment, the positioning tube 80 is fixedly attached to the bottom portion 8. Incidentally, the positioning tube 80 may be slidably accommodated in the bottom portion 8, in which a sealing is provided for sealing the interior 3 of the reactor 2 with respect to the environment (not illustrated). It is also possible for the positioning tube 80 to have a larger diameter than the riser 24—the bottom end 26 of the riser 24 then extends freely inside the positioning tube 80.

The sand underneath the nozzles 27 is substantially immobile. As stationary sand forms an excellent heat insulation, the temperature in the bed of sand under the nozzles 27 will decrease with increasing depth. The greater the vertical distance from the nozzles 27, i.e. the fluidized bed, the lower the temperature. This means that the bottom end 26 of the riser 24 will be relatively cold, which results in various advantages.

The bottom section 7 is provided with apertures, which are closed off by funnels 61. At the bottom head end, the positioning tube 80 is likewise closed off by a funnel 60. The bed of sand of the combustion chamber 50 and the riser 24 thus rest on the funnels 60, 61. The funnels 60, 61 each have a draw-off means or draining means for drawing off grains of sand. Any impurities in the sand, such as small pebbles, can thus be removed.

The supply opening 18 of the reactor 2 for supplying biomass is arranged laterally in the peripheral wall portion 14. The feed opening 32 of the riser 24 is aligned with respect to the supply opening 18 of the reactor 2 (see FIG. 3). To this end, the riser 24 is situated eccentrically with respect to the peripheral wall portion 14. At the location of the feed opening 32, the lateral outer wall of the riser 24 bears against the lateral inner wall of the peripheral wall portion 14. The risk of biomass leaking away between the riser 24 and the peripheral wall portion 14 is then reduced to a minimum.

The riser 24 furthermore has at least one passage opening 33 for the passage of grains of sand. A duct 34 provides a connection between the bed of sand in the combustion chamber 50 and the bed of sand in the riser 24. The grains of sand flow via the duct 34 through the passage opening 33 into the riser 24.

The passage area of the passage opening 33 is defined by the positioning tube 80. If, for example, the positioning tube 80 in FIG. 1 is placed in an upward position, the passage area of the passage opening 33 is reduced, for example. In that case, the top end of the positioning tube partially closes off the passage opening 33. The vertical position of the positioning tube 80 is a design parameter. Said position can be determined beforehand, and the positioning tube 80 is subsequently fixedly attached in said position. It is also possible for the positioning tube 80 to be able to slide through the bottom section 8, as indicated above, so that the vertical position thereof can be adjusted.

Figure 2:
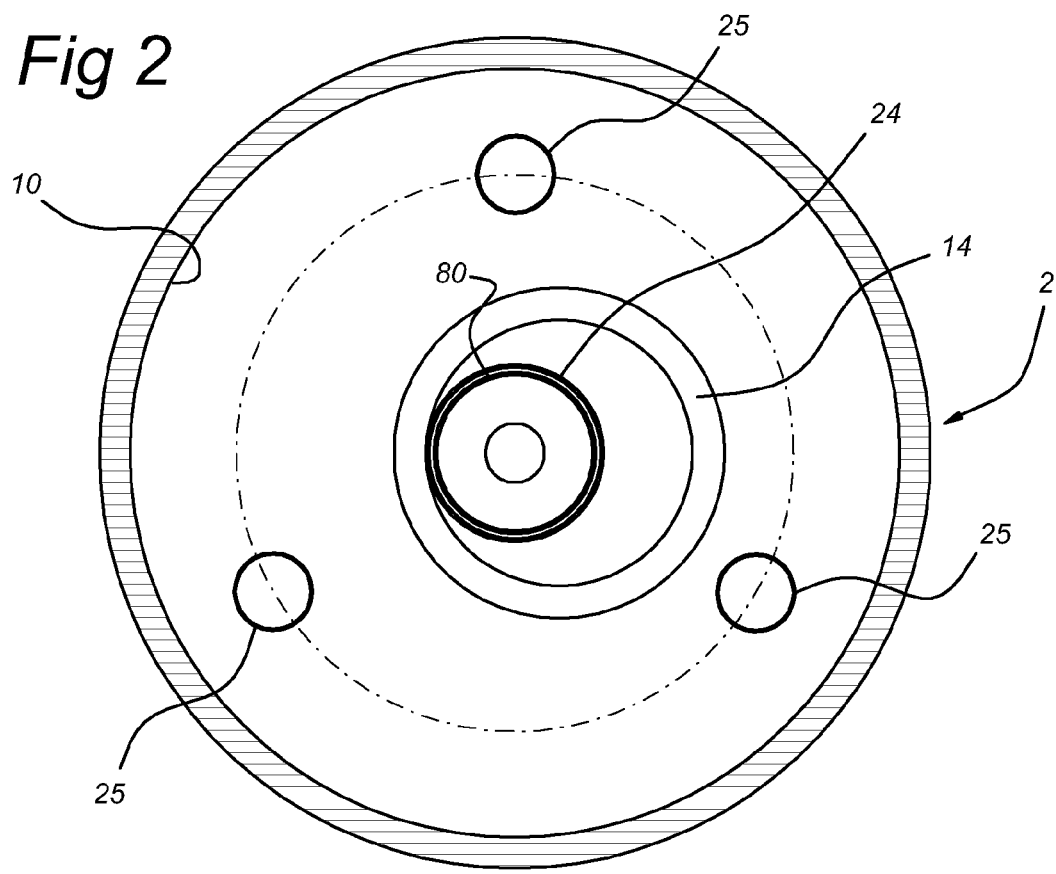
FIG. 2 shows a cross-sectional view along II-II in FIG. 1.
Figure 4:
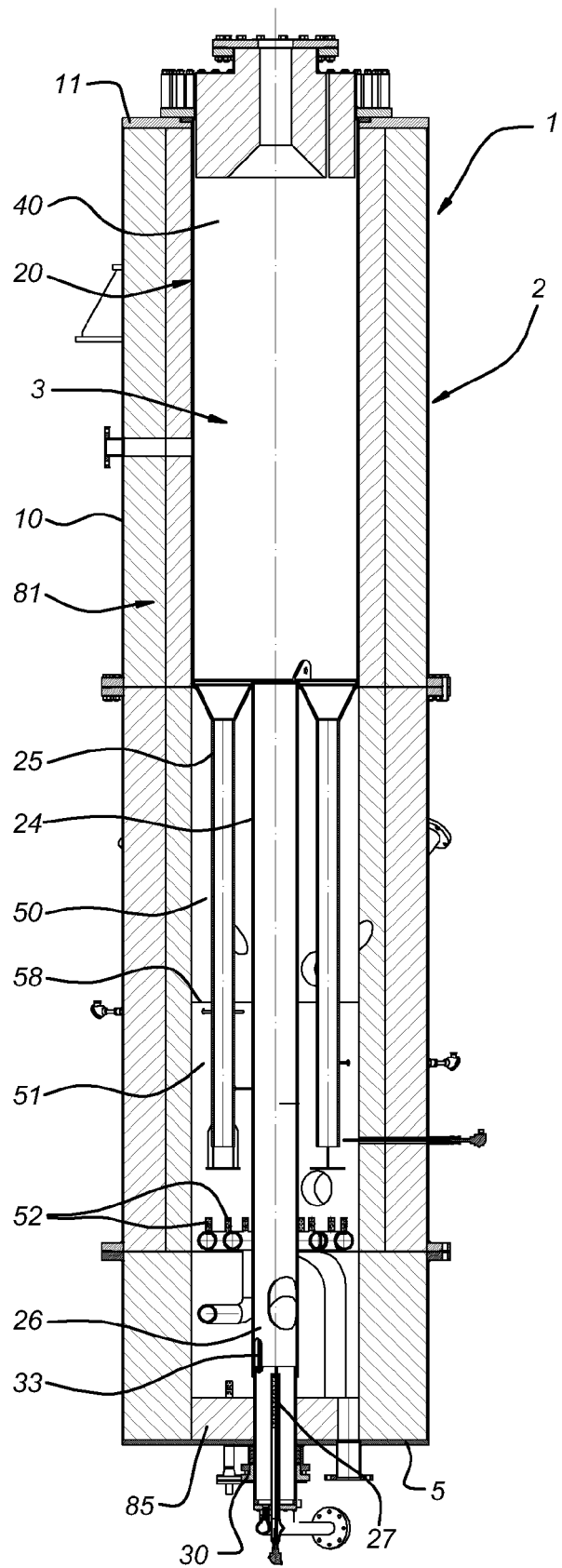
FIG. 4 shows a cross-sectional view of the device for producing a product gas from biomass according to a second embodiment of the invention.
Figure 5:
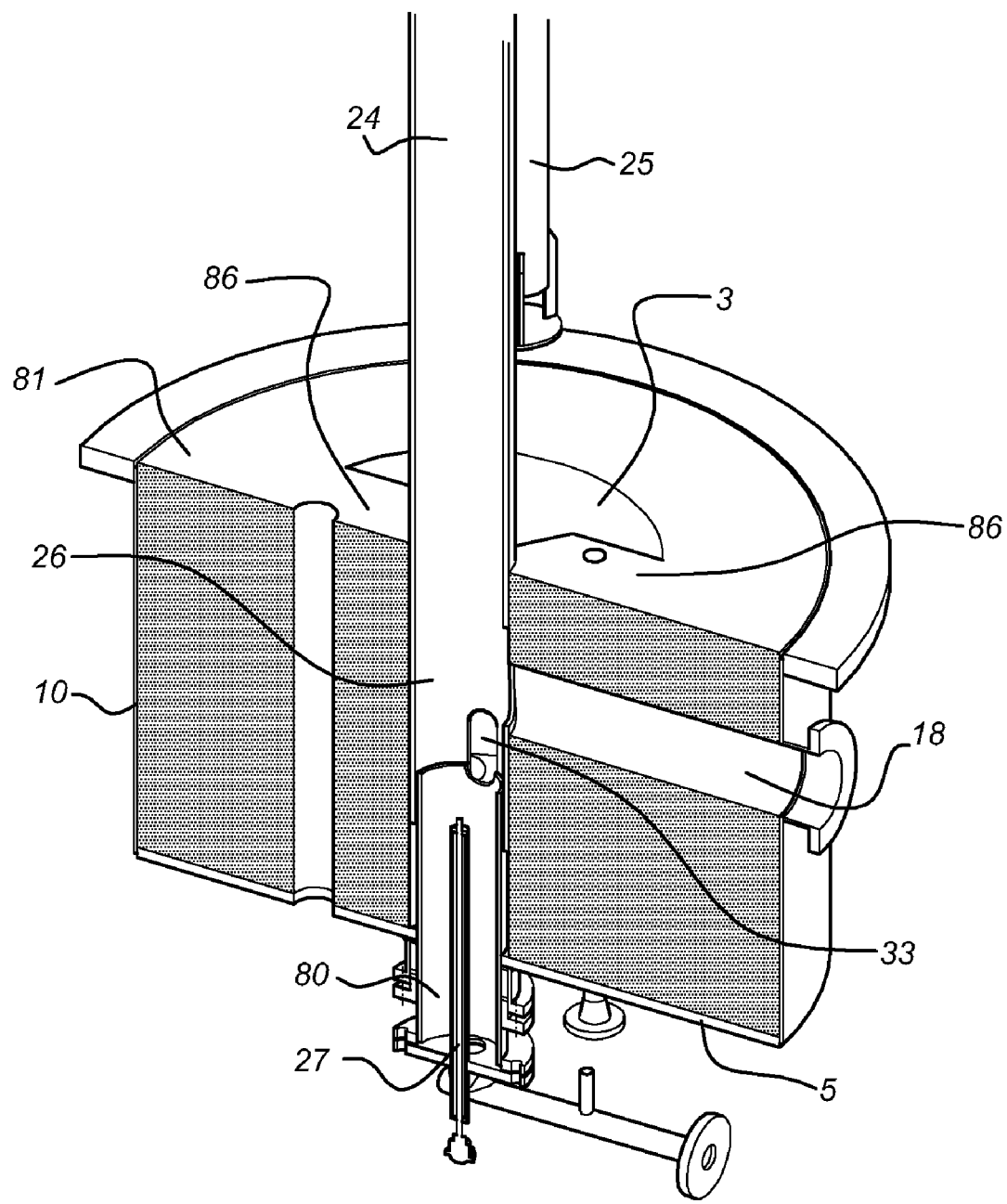
FIG. 5 shows a perspective view of a part of the device illustrated in FIG. 4.

FIGS. 4 and 5 show a second embodiment of the device for producing a product gas from biomass according to the invention. The operation thereof substantially corresponds to the embodiment illustrated in FIGS. 1-3. The above-described advantages and variants also apply to the second embodiment. Identical or similar parts are therefore denoted by the same reference numerals.

FIGS. 4 and 5 illustrate a heat-insulating body 81. The heat-insulating body 81 can be designed in various ways and comprise various materials. The heat-insulating body 81 has a peripheral section or portion, which forms part of the peripheral wall 10, and a bottom section or portion 85 which forms part of the bottom 5. The heat-insulating body 81 forms an inner cladding or brick lining of the reactor 2. Inside the heat-insulating body 81, a space is provided in which the frame 20 is arranged. The frame 20 comprises the separation chamber 40, the riser 24 and the downcomers 25. The frame 20 is suspended from the top wall 11 of the reactor 2.

In this exemplary embodiment, the separation chamber 40 has a metal bottom wall and a metal peripheral wall, which form part of the frame 20. The metal walls of the separation chamber 40 adjoin the space provided in the heat-insulating body 81. The bottom wall forms a partition wall 48 between the separation chamber 40 and the combustion chamber 50. The riser 24 and the downcomers 25 extend downwards from the separation wall 48 as far as into the fluidized bed of granular material, for example a bed of sand 51. The level of the bed of sand is indicated in FIG. 4 by reference numeral 58.

The bottom end 26 of the riser 24 is at a distance above the heat-insulating bottom section 85 of the bottom 5 situated underneath. Below the free bottom end 26 of the riser 24, the expansion of the riser 24 under the effect of the changes in temperature can be accommodated for. The thermal extension is, for example, approximately 5 cm—in this case, the bottom end 26 can extend downwards by at least said distance without touching the bottom section 85.

It should be noted that the heat-insulating body 81 is optional. The reactor 2, for example, is made of a heat-resistant material, such as heat-resistant steel, so that the heat-insulating body 81 can be omitted (not illustrated). In that case, the bottom end 26 is arranged at such a distance from the bottom 5, in particular the section of the bottom 5 which is situated underneath according to the longitudinal axis of the reactor 2, that the bottom end 26 can expand as a result of changes in temperature without touching the bottom 5.

As is illustrated in FIG. 5, the bottom end 26 of the riser 24 is movably accommodated between two projections 86 of the heat-insulating body 81. The projections 86 prevent the bottom end 26 of the riser 24 from bending off to the side during thermal expansion of the riser 24.

In this exemplary embodiment, a positioning tube 80 is furthermore provided for positioning the bottom end 26 of the riser 24. The positioning tube 80 is optional, i.e. can be omitted. The positioning tube 80 and the riser 24 have different diameters and are partially pushed into one another. An annular gap is provided between the positioning tube 80 and the riser 24. The positioning tube 80 and the riser 24 form a split riser, as it were, which can accommodate for thermal expansion at the partition.

The nozzle 27 is provided in the positioning tube 80. The nozzle 27 has several spray openings for supplying fluidizing fluid. The "dead" zone is situated between the bottom spray openings and the top surface of the bottom 5. In this exemplary embodiment, the bottom end 26 of the riser 24 is above the "dead" zone. The bottom end 26 will therefore be relatively hot.

In this exemplary embodiment, the positioning tube 80 extends through the bottom 5 by means of a sealing 30. The sealing 30 is situated in the relatively cold "dead" zone of the fluidized bed. The positioning tube 80 is for example fixedly attached or can be slid through the bottom 5.

The positioning tube 80 partially closes off the passage opening 33 against the granular material of the fluidized bed (see FIG. 5). The granular material of the fluidized bed 51 can flow into the riser 24 from the combustion chamber 50 via the passage opening 33 and via the annular gap. The annular gap has a dual purpose: on the one hand, the annular gap enables the thermal expansion of the riser 24 with respect to the positioning tube 80 and, on the other hand, the annular gap provides a passage for the transport of granular material.

The supply 18 for supplying biomass is situated above the passage opening 33 for the granular material. The supplied biomass thus passes immediately into a hot zone of the fluidized bed 51 in use.

Of course, the invention is not limited to the embodiments illustrated in the figures. The person skilled in the art can make various modifications without departing from the scope of the invention. For example, the invention can also be used for fuels other than biomass and any suitable granular material may be used instead of sand.

The invention claimed is:

1. A device for producing a product gas from a fuel, such as biomass, comprising a reactor which is delimited by a base and reactor walls, which reactor walls comprise a peripheral wall and an upper wall, which reactor comprises:
   a supply opening for the supplying of fuel,
   at least one riser for chemically converting the fuel supplied to at least a product gas, which riser is provided inside the peripheral wall and comprises an upper end and a lower end, as well as
   a discharge opening for the discharging of the product gas, in which the riser is attached to at least one reactor wall, and the lower end of the riser is at a distance above at least one section of the base which is underneath it and is freely movable under the effect of thermal expansion, in which the reactor is provided with a positioning member for positioning the lower end of the riser.

2. The device as claimed in claim 1, in which the upper end of the riser is attached to at least one reactor wall.

3. The device as claimed in claim 1, in which the upper end of the riser is attached by a partition wall to the peripheral wall of the reactor, and in which the interior of the reactor comprises a separation chamber and a combustion chamber, which are separated from one another in a substantially gas-tight manner by the partition wall.

4. The device as claimed in claim 1, in which the reactor comprises a fluidizable bed of granular material, which is arranged on the base of the reactor, and in which the lower end of the riser extends into the fluidizable bed.

5. The device as claimed in claim 1, in which at least one nozzle for injecting a fluidizing fluid is provided in or under the riser.

6. The device as claimed in claim 1, in which the lower end of the riser is situated underneath the supply opening for supplying fuel.

7. The device as claimed in claim 1, in which the riser is open at its upper end, and in which the reactor comprises a separation chamber between the open upper end of the riser and the upper wall for separating gas and solid particles.

8. The device as claimed in claim 7, in which the reactor is provided with a combustion chamber which is connected to the separation chamber by at least one downcomer.

9. The device as claimed in claim 8, in which the riser is provided with a passage opening for allowing granular material to pass from the combustion chamber to the riser, the passage opening being arranged underneath the supply opening for the supplying of biomass.

10. The device as claimed in claim 8, in which the combustion chamber comprises several nozzles for supplying fluidizing air.

11. The device as claimed in claim 8, in which the riser and the downcomer form part of a frame which is suspended from at least one of the reactor walls of the reactor.

12. The device as claimed in claim 1, in which the positioning member is provided with a positioning tube which is aligned with respect to the riser, and in which the positioning tube and the riser are partially fitted inside one another.

13. The device as claimed in claim 12, in which an annular gap is formed between the positioning tube and the riser, and in which the radial distance of said gap is greater than 1 mm.

14. The device as claimed in claim 12, in which the base has a passage opening in which the positioning tube is fixed.

15. The device as claimed in claim 1, in which the discharge opening is arranged in the upper wall, which discharge opening is substantially aligned with respect to the open upper end of the riser.

* * * * *